(12) United States Patent
Brown et al.

(10) Patent No.: US 6,192,281 B1
(45) Date of Patent: Feb. 20, 2001

(54) NETWORK ACCESSIBLE INTERFACE FOR A PROCESS CONTROL NETWORK

(75) Inventors: Larry K. Brown; Harry A. Burns; Brent H. Larson, all of Marshalltown, IA (US)

(73) Assignee: Fisher Controls International, Inc., Clayton, MO (US)

( * ) Notice: Under 35 U.S.C. 154(b), the term of this patent shall be extended for 0 days.

(21) Appl. No.: 08/983,017
(22) PCT Filed: Oct. 2, 1997
(86) PCT No.: PCT/US97/17712
  § 371 Date: Dec. 30, 1997
  § 102(e) Date: Dec. 30, 1997

Related U.S. Application Data

(63) Continuation-in-part of application No. 08/726,264, filed on Oct. 4, 1996, now abandoned.

(51) Int. Cl.[7] .................................................. G05B 15/00
(52) U.S. Cl. ..................... 700/2; 700/3; 700/5; 700/17; 700/83; 709/208; 709/217; 710/105; 710/110
(58) Field of Search .................................. 700/2, 5, 9, 17, 700/18, 83–84, 86; 709/208, 211, 217, 218; 710/101, 110, 105

(56) References Cited

U.S. PATENT DOCUMENTS

| | | | |
|---|---|---|---|
| 4,271,505 | 6/1981 | Menot et al. | 370/85 |
| 4,627,045 | 12/1986 | Olson et al. | 370/16 |
| 4,691,328 | 9/1987 | Sterling, Jr. et al. | 375/36 |

(List continued on next page.)

FOREIGN PATENT DOCUMENTS

| | | |
|---|---|---|
| 195 10 466 A1 | 10/1996 | (DE) . |
| 0 450 116 A1 | 4/1990 | (EP) . |
| 0 449 458 A1 | 10/1991 | (EP) . |

(List continued on next page.)

OTHER PUBLICATIONS

Fieldbus Foundation Manual, Communications Technical Specification and User Layer Technical Specification, 1994–1997, including Fieldbus Message Specification FF–870–1.1; Physical Layer Conformance Testing FF–830 FS 1.0; Device Description Language FF–900–1.0; Function Blocks (Part 1) FF–890–1.2; Fieldbus Access Sublayer FF–875–1.1; Function Blocks (Part 2) FF–891–1.2; Data Link Protocol FF–822–1.1; System Management FF–880–1.1; Communication Profile FF–940–1.0; Transducer Blocks (Part 1) FF–902 Rev PS 2.0; Transducer Blocks (Part 2) FF–903–Rev PS 2.0; Data Link Services FF–821–1.0; 31.25 kbit/s Physical Layer Profile FF–816–1.0; Network Management FF–801–1.1; and System Architecture FF–800–1.0.

"Fieldvue® ValveLink™ Series VL2000 Software," Fisher–Rosemount Bulletin 62.1: VL2000, pp. 1–6 (Nov. 1995).

"Fieldvue® VL2000 Series Software User Guide," Fisher Controls, Version 2.0 (Jun. 1996).

"Fieldvue® Digital Valve Controller Type DVC5000 Series," Fisher–Rosemount Bulletin 62.1:DVC5000, pp. 1–12 (Jun. 1994).

(List continued on next page.)

*Primary Examiner*—Paul P. Gordon
*Assistant Examiner*—Ramesh Patel
(74) *Attorney, Agent, or Firm*—Marshall, O'Toole, Gerstein, Murray & Borun

(57) ABSTRACT

An interface between a remote communications network and a process control system includes a storage device, a communication software stack and a user software layer. The user software layer enables interfacing between the remote communications network and the process control system by directing the communication software stack to operate in the process control system using a process communication protocol, by monitoring the message traffic on the communication software stack, and by copying requested message traffic to the storage device. The user software layer also includes media interface software that allows access to the storage device by the remote communications network to thereby deliver specific data to a device connected to the remote communications network.

20 Claims, 8 Drawing Sheets

U.S. PATENT DOCUMENTS

| | | | |
|---|---|---|---|
| 4,831,558 | 5/1989 | Shoup et al. ............ | 364/550 |
| 4,918,690 | 4/1990 | Markkula, Jr. et al. ............ | 370/94 |
| 4,955,305 | 9/1990 | Garnier et al. ............ | 112/121.11 |
| 4,974,625 | 12/1990 | Paullus et al. ............ | 137/85 |
| 4,976,144 | 12/1990 | Fitzgerald ............ | 73/168 |
| 5,014,185 | 5/1991 | Saito et al. ............ | 364/188 |
| 5,023,869 | 6/1991 | Grover et al. ............ | 370/84 |
| 5,032,525 * | 7/1991 | Lee et al. ............ | 436/55 |
| 5,109,692 | 5/1992 | Fitzgerald ............ | 73/168 |
| 5,132,904 * | 7/1992 | Lamp ............ | 364/422 |
| 5,148,433 | 9/1992 | Johnson et al. ............ | 371/11.3 |
| 5,193,189 | 3/1993 | Flood et al. ............ | 395/650 |
| 5,197,328 | 3/1993 | Fitzgerald ............ | 73/168 |
| 5,404,524 | 4/1995 | Celi, Jr. ............ | 395/700 |
| 5,434,774 | 7/1995 | Seberger et al. ............ | 364/172 |
| 5,439,021 | 8/1995 | Burlage et al. ............ | 137/84 |
| 5,451,923 | 9/1995 | Seberger et al. ............ | 340/310.06 |
| 5,469,150 | 11/1995 | Sitte ............ | 340/825.07 |
| 5,469,548 | 11/1995 | Callison et al. ............ | 395/441 |
| 5,485,455 | 1/1996 | Dobbins et al. ............ | 370/60 |
| 5,530,643 | 6/1996 | Hodorowski ............ | 364/191 |
| 5,558,115 | 9/1996 | Lenz et al. ............ | 137/86 |
| 5,573,032 | 11/1996 | Lenz et al. ............ | 137/486 |
| 5,592,622 | 1/1997 | Isfeld et al. ............ | 395/200.02 |
| 5,631,825 | 5/1997 | van Weele et al. ............ | 364/188 |
| 5,650,777 | 7/1997 | Westfield et al. ............ | 340/870.11 |
| 5,672,975 * | 9/1997 | Kielb et al. ............ | 324/644 |
| 5,684,451 | 11/1997 | Seberger et al. ............ | 340/310.06 |
| 5,778,151 * | 7/1998 | Gramckow et al. ............ | 395/22 |

FOREIGN PATENT DOCUMENTS

| | | |
|---|---|---|
| 0 546 339 A1 | 6/1993 | (EP) . |
| 0 562 333 A2 | 9/1993 | (EP) . |
| 0 575 150 A2 | 12/1993 | (EP) . |
| 0 604 091 A2 | 6/1994 | (EP) . |
| WO 92/04676 | 3/1992 | (WO) . |
| WO 94/22776 | 10/1994 | (WO) . |
| WO 96/12993 | 5/1996 | (WO) . |

OTHER PUBLICATIONS

"Fieldvue™, Digital Valve Controller DVC5000 Series Remotely Accessible Information," Fisher Controls Bulletin 62.1:DVC5000(S1), pp. 1–2 (Jun. 1994).

"Fieldvue™ Digital Valve Controller Type DVC5000 Series," Fisher Controls Form 5335, pp. 1–35 and Errata Sheet (Jun. 1994).

Fisher–Rosemount Systems, "Fieldbus Technical Overview Understanding Foundation™ Fieldbus Technology," 27 pages, 1997.

"Foundation™ Specification, Function Block Application Process," Part 3, 155 pages, 1995–1996.

Fieldbus Foundation™, "Technical Overview," FD–043 Revision 1.0, 29 pages, 1996.

Fromberger, "Feldbusfähige, intelligente Sensoren," Messen und Prüfen, vol. 27, No. 7, pp. 332, 334–340, 1991.

Watt, "The Double–Distributed Control Network," Thesis submitted to Thayer School of Engineering, Dartmouth College, Hanover, N.H. (Jan. 1984).

Zielinski et al., "Asset Management Using Fieldbus," Fisher–Rosemont Systems, Inc, pp. 1–14 (1997).

"Advanced Systems Simplify Control," Machine Design, vol. 68, No. 12, pp. 118, 120 (Jul. 11, 1996).

Black, "Combining Lan Technology with Smart Sensors to Provide Predictive Maintenance, Diagnostics and Alarm Systems," Proceedings of the Industrial Computing Conference, Chicago, vol. 3, Sep. 19, 1993, Industrial Computing Society/Instrument Society of America, pp. 345–354 (1993).

Zielinski, "Issues for Digital Field Instrument Networks," INTECH, pp. 92–94 (1989).

PCT International Search Report for PCT/US97/17712 mailed Jan. 28, 1998.

Office Action mailed Dec. 16, 1997, issued in U.S. Patent Application Serial No. 08/726,264.

PCT Written Opinion issued in PCT application PCT/US97/17712 dated Jul. 8, 1998.

* cited by examiner

NETWORK ACCESSIBLE INTERFACE FOR A PROCESS CONTROL NETWORK

RELATED APPLICATION

This is a continuation-in-part of U.S. patent application Ser. No. 08/726,264, filed Oct. 4, 1996, now abandoned.

FIELD OF THE INVENTION

The present invention relates generally to process control networks and, more specifically, to an interface that communicates data between a process control network having distributed control functions and a remote communications network.

DESCRIPTION OF THE RELATED ART

Large processes such as chemical, petroleum, and other manufacturing and refining processes include numerous field devices disposed at various locations to measure and control parameters of a process to thereby effect control of the process. These field devices may be, for example, sensors such as temperature, pressure, and flow rate sensors as well as control elements such as valves and switches. Historically, the process control industry used manual operations like manually reading level and pressure gauges, turning valve wheels, etc., to operate the measurement and control field devices within a process. Beginning in the 20th century, the process control industry began using local pneumatic control, in which local pneumatic controllers, transmitters, and valve positioners were placed at various locations within a process plant to effect control of certain plant locations. With the emergence of the microprocessor-based distributed control system (DCS) in the 1970's, distributed electronic process control became prevalent in the process control industry.

As is known, a DCS includes an analog or a digital computer, such as a programmable logic controller, connected to numerous electronic monitoring and control devices, such as electronic sensors, transmitters, current-to-pressure transducers, valve positioners, etc. located throughout a process. The DCS computer stores and implements a centralized and, frequently, complex control scheme to effect measurement and control of devices within the process to thereby control process parameters according to some overall control scheme. Usually, however, the control scheme implemented by a DCS is proprietary to the DCS controller manufacturer which, in turn, makes the DCS difficult and expensive to expand, upgrade, reprogram, and service because the DCS provider must become involved in an integral way to perform any of these activities. Furthermore, the equipment that can be used by or connected within any particular DCS may be limited due to the proprietary nature of DCS controller and the fact that a DCS controller provider may not support certain devices or functions of devices manufactured by other vendors.

To overcome some of the problems inherent in the use of proprietary DCSs, the process control industry has developed a number of standard, open communication protocols including, for example, the HART®, PROFIBUS®, WORLDFIP®, Device-Net®, and CAN protocols, which enable field devices made by different manufacturers to be used together within the same process control network. In fact, any field device that conforms to one of these protocols can be used within a process to communicate with and to be controlled by a DCS controller or other controller that supports the protocol, even if that field device is made by a different manufacturer than the manufacturer of the DCS controller.

Moreover, there is now a move within the process control industry to decentralize process control and, thereby, simplify DCS controllers or eliminate the need for DCS controllers to a large extent. Decentralized control is obtained by having field mounted process control devices, such as valve positioners, transmitters, etc. perform one or more process control functions and by then communicating data across a bus structure for use by other process control devices in performing other control functions. To implement these control functions, each process control device includes a microprocessor having the capability to perform a control function as well as the ability to communicate with other process control devices using a standard and open communication protocol. In this manner, field devices made by different manufacturers can be interconnected within a process control network to communicate with one another and to perform one or more process control functions forming a control loop without the intervention of a DCS controller. The all-digital, two-wire bus protocol now being promulgated by the Fieldbus Foundation, known as the FOUNDATION™ Fieldbus (hereinafter "Fieldbus") protocol is one open communication protocol that allows devices made by different manufacturers to interoperate and communicate with one another via a standard bus to effect decentralized control within a process.

Thus, process control systems have expanded from local communication loops including a number of field devices connected to one or more controllers to large scale communication networks. However, it is currently difficult to transmit field device information on a process control network to other communication networks, perhaps over large distances, to effect, for example, performance analysis, diagnostic testing, maintenance and trouble-shooting and the like. In fact, a satisfactory technique for transferring fundamental-level field device information, such as process control valve data, has not been found. While, transfer of field device information has been attempted using fiber-optic communication between multiple remote process control sites, such a fiber-optic interconnection between sites is expensive and conflicts often arise in when multiple devices attempt to send information at the same time. Furthermore, the fiber-optic systems include complex communication controllers that arbitrate usage of the bus. Because each data transmission of this system is synchronous with the collection of data at the individual field devices, data collection is stalled while waiting for access to the fiber-optic line and communications are stalled while waiting for the collection of data.

Transmission of field data over a network conventionally involves the passing of encapsulated information packets through network-to-network connections (typically, LAN-to-LAN networks). The packets are encapsulated and have transfer parameters added thereto at each node of the network so that the information packets gain additional extraneous information and require processing time at each node. This conventional remote communication technique is slowed by delays at each node and is inefficient due to the addition of extraneous information at each encapsulation.

It is desirable, therefore, to provide a simple interface device that communicates field device data between a process control network and a communication network or other remote sites without requiring the field devices within the process control network to stall operation while waiting for access to the communication network and without requiring unnecessary processing at each node of the network.

SUMMARY OF THE INVENTION

The present invention is directed to an interface device that interfaces between a communications network and a process control network that does not alter the communications occurring in the process control network and that does not require the addition of extraneous data to packets on the communication network. The interface device of the present invention may be formed by a computer executing a software communication protocol associated with, for example, the Fieldbus communication protocol, and a user software layer that processes Fieldbus requests from a single user or multiple users across a local area network (LAN) or a wide area network (WAN). The user software layer provides a direct interface to the Fieldbus communication network in a device to a remote site via a network connection.

In accordance with the present invention, an interface between a communications network and a process control system includes a communication software stack operating in a process control system and interface software including a routine that monitors message traffic on the communication software stack, a routine that copies the message traffic to storage, and a media interface software routine that allows remote access to the storage.

Many advantages are achieved by the described interface and operating method. For example, the interface device of the present invention converts a time-critical operation of monitoring low-level field data to a non-time-critical operation of transmitting data to a remote site. Another advantage is that the described interface and method is highly generic and can be implemented in a wide variety of control systems and networks on virtually any computer system using standard software elements. Furthermore, it is advantageous that only a small amount of data, i.e., the pertinent or requested data, is transferred and that the interface substantially reduces the overhead expenditure in time and data transfer size when communicating field device data over a secondary or remote communications network.

With the interface of the present invention, diagnostic testing, maintenance and trouble-shooting can be performed or implemented from a remote site connected to the process control network via a communications bus such as a LAN or a WAN. Messages and information are advantageously transmitted very rapidly and data is transmitted asynchronously and independently between the local user and the remote user so that synchronization problems are avoided.

DESCRIPTION OF THE PREFERRED EMBODIMENTS

Figure 1:
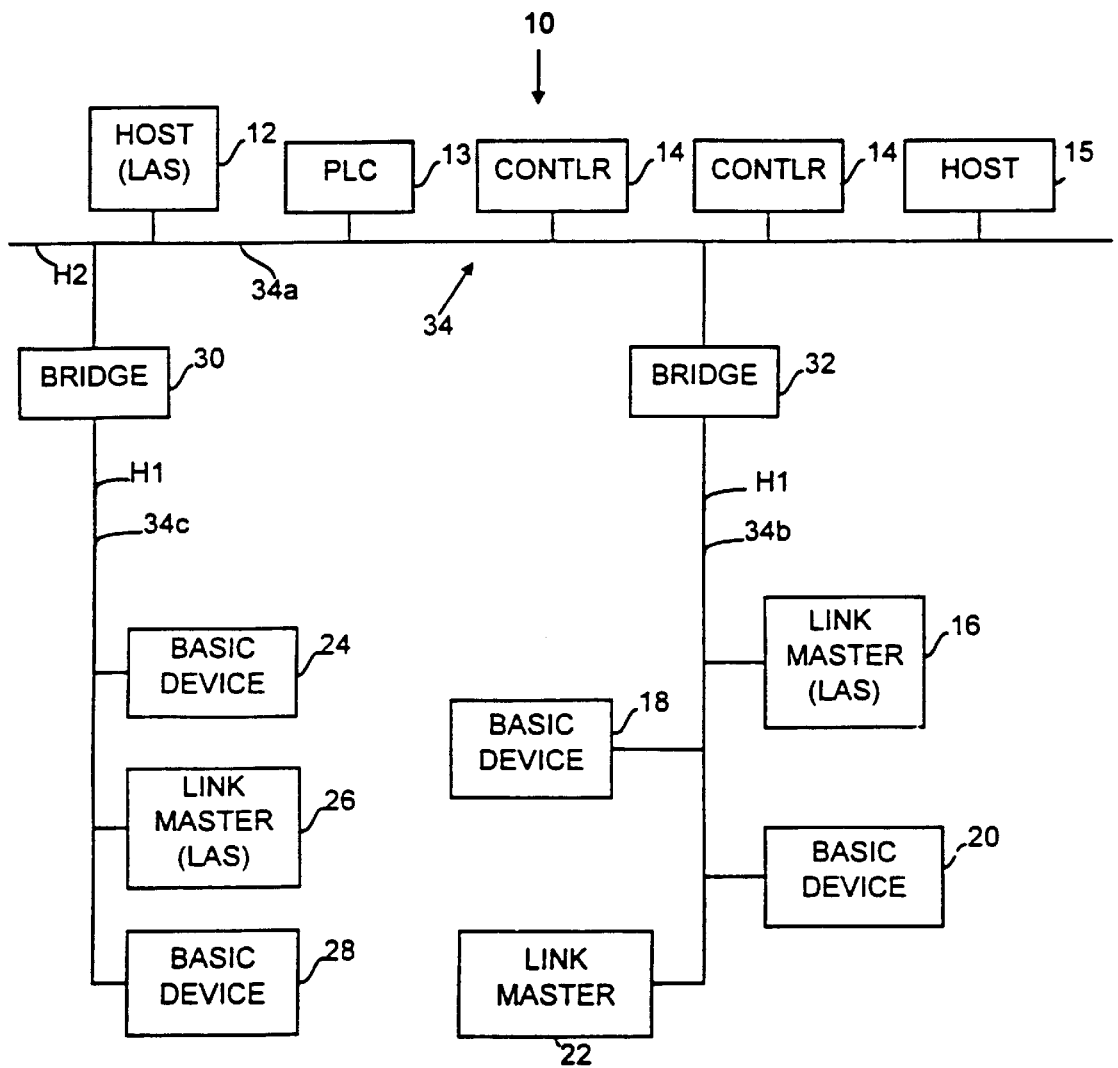
FIG. 1 is a schematic block diagram of an example process control network using the Fieldbus protocol.

While the network accessible Fieldbus interface (NAFI) of the present invention is described in detail in conjunction with a process control network that implements process control functions in a decentralized or distributed manner using a set of Fieldbus devices, it should be noted that the NAFI device of the present invention can be used with process control networks that perform distributed control functions using other types of field devices and communication protocols, including protocols that rely on other than two-wire buses and protocols that support analog and digital communications. Thus, for example, the NAFI device of the present invention can be used in any process control network that performs distributed control functions even if this process control network uses the HART, PROFIBUS, etc. communication protocols or any other communication protocols that now exist or that may be developed in the future. Likewise, if desired, the NAFI device of the present invention can be used in process control networks that do not have distributed control functions but, instead, that use a centralized controller or control scheme to control the devices therein.

Before discussing the details of the NAFI device of the present invention, a general description of the Fieldbus protocol, field devices configured according to this protocol, and the way in which communication occurs in a process control network that uses the Fieldbus protocol will be provided. However, it should be understood that, while the Fieldbus protocol is a relatively new all-digital communication protocol developed for use in process control networks, this protocol is known in the art and is described in detail in numerous articles, brochures and specifications published, distributed, and available from, among others, the Fieldbus Foundation, a not-for-profit organization headquartered in Austin, Tex. In particular, the Fieldbus protocol, and the manner of communicating with and storing data in devices using the Fieldbus protocol, is described in detail in the manuals entitled Communications Technical Specification and User Layer Technical Specification from the Fieldbus Foundation, which are hereby incorporated by reference in their entirety herein.

The Fieldbus protocol is an all-digital, serial, two-way communication protocol that provides a standardized physical interface to a two-wire loop or bus interconnecting "field" equipment such as sensors, actuators, controllers, valves, etc. located in an instrumentation or process control environment of, for example, a factory or a plant. The Fieldbus protocol provides, in effect, a local area network for field instruments (field devices) within a process, which enables these field devices to perform control functions at locations distributed throughout a process facility and to communicate with one another before and after the performance of these control functions to implement an overall control strategy. Because the Fieldbus protocol enables control functions to be distributed throughout a process control network, it reduces the workload of, or entirely eliminates the necessity of the centralized process controller typically associated with a DCS.

Referring to FIG. 1, a process control network 10 using the Fieldbus protocol may include a host 12 connected to a number of other devices such as a program logic controller (PLC) 13, a number of controllers 14, another host device 15 and a set of field devices 16, 18, 20, 22, 24, 26, 28, 30, and 32 via a two-wire Fieldbus loop or bus 34. The bus 34 includes different sections or segments, 34*a*, 34*b*, and 34*c* which are separated by bridge devices 30 and 32. Each of the sections 34*a*, 34*b*, and 34*c* interconnects a subset of the devices attached to the bus 34 to enable communications between the devices in a manner described hereinafter. Of course, the network of FIG. 1 is illustrative only, there being many other ways in which a process control network may be configured using the Fieldbus protocol. Typically, a configurer is located in one of the devices, such as the host 12, and is responsible for setting up or configuring each of the devices (which are "smart" devices in that they each include a microprocessor capable of performing communication and, in some cases, control functions) as well as recognizing when new field devices are connected to the bus 34, when field devices are removed from the bus 34, recognizing data generated by the field devices 16–32, and interfacing with one or more user terminals, which may be located in the host 12 or in any other device connected to the host 12 in any manner.

The bus 34 supports or allows two-way, purely digital communication and may also provide a power signal to any or all of the devices connected thereto, such as the field devices 16–32. Alternatively, any or all of the devices 12–32 may have their own power supplies or may be connected to external power supplies via separate wires (not shown). While the devices 12–32 are illustrated in FIG. 1 as being connected to the bus 34 in a standard bus-type connection, in which multiple devices are connected to the same pair of wires making up the bus segments 34*a*, 34*b*, and 34*c*, the Fieldbus protocol allows other device/wire topologies including point-to-point connections, in which each device is connected to a controller or a host via a separate two-wire pair (similar to typical 4–20 MA analog DCS systems), and tree or "spur" connections in which each device is connected to a common point in a two-wire bus which may be, for example, a junction box or a termination area in one of the field devices within a process control network.

Data may be sent over the different bus segments 34*a*, 34*b*, and 34*c* at the same or different communication baud rates or speeds according to the Fieldbus protocol. For example, the Fieldbus protocol provides a 31.25 Kbit/s communication rate (H1), illustrated as being used by the bus segments 34*b* and 34*c* of FIG. 1, and a 1.0 Mbit/s and/or a 2.5 Mbit/s (H2) communication rate, which will be typically used for advanced process control, remote input/output, and high speed factory automation applications and is illustrated as being used by the bus segment 34*a* of FIG. 1. Likewise, data may be sent over the bus segments 34*a*, 34*b*, and 34*c* according to the Fieldbus protocol using voltage mode signaling or current mode signaling. Of course, the maximum length of each segment of the bus 34 is not strictly limited but is, instead, determined by the communication rate, cable type, wire size, bus power option, etc. of that section.

The Fieldbus protocol classifies the devices that can be connected to the bus 34 into three primary categories, namely, basic devices, link master devices, and bridge devices. Basic devices (such as devices 18, 20, 24, and 28 of FIG. 1) can communicate, that is, send and receive communication signals on or from the bus 34, but are not capable of controlling the order or timing of communication that occurs on the bus 34. Link master devices (such as devices 16, 22, and 26 as well as the host 12 of FIG. 1) are devices that communicate over the bus 34 and are capable of controlling the flow of and the timing of communication signals on the bus 34. Bridge devices (such as devices 30 and 32 of FIG. 1) are devices configured to communicate on and to interconnect individual segments or branches of a Fieldbus bus to create larger process control networks. If desired, bridge devices may convert between different data speeds and/or different data signaling formats used on the different segments of the bus 34, may amplify signals traveling between the segments of the bus 34, may filter the signals flowing between the different segments of the bus 34 and pass only those signals destined to be received by a device on one of the bus segments to which the bridge is coupled and/or may take other actions necessary to link different segments of the bus 34. Bridge devices that connect bus segments that operate at different speeds must have link master capabilities at the lower speed segment side of the bridge. The hosts 12 and 15, the PLC 13, and the controllers 14 may be any type of fieldbus device but, typically, will be link master devices.

Each of the devices 12–32 is capable of communicating over the bus 34 and, importantly, is capable of independently performing one or more process control functions using data acquired by the device, from the process, or from a different device via communication signals on the bus 34. Fieldbus devices are, therefore, capable of directly implementing portions of an overall control strategy which, in the past, were performed by a centralized digital controller of a DCS. To perform control functions, each Fieldbus device includes one or more standardized "blocks" which are implemented in a microprocessor within the device. In particular, each Fieldbus device includes one resource block, zero or more function blocks, and zero or more transducer blocks. These blocks are referred to as block objects.

A resource block stores and communicates device specific data pertaining to some of the characteristics of a Fieldbus device including, for example, a device type, a device revision indication, and indications of where other device specific information may be obtained within a memory of the device. While different device manufacturers may store different types of data in the resource block of a field device, each field device conforming to the Fieldbus protocol includes a resource block that stores some data.

A function block defines and implements an input function, an output function, or a control function associated with the field device and, thus, function blocks are generally referred to as input, output, and control function blocks. However, other categories of function blocks such as hybrid function blocks may exist or may be developed in the future. Each input or output function block produces at least one process control input (such as a process variable from a process measurement device) or process control output (such as a valve position sent to an actuation device) while each control function block uses an algorithm (which may be proprietary in nature) to produce one or more process outputs from one or more process inputs and control inputs. Examples of standard function blocks include analog input (AI), analog output (AO), bias (B), control selector (CS), discrete input (DI), discrete output (DO), manual loader (ML), proportional/derivative (PD), proportional/integral/derivative (PID), ratio (RA), and signal selector (SS) function blocks. However, other types of function blocks exist and new types of function blocks may be defined or created to operate in the Fieldbus environment.

A transducer block couples the inputs and outputs of a function block to local hardware devices, such as sensors and device actuators, to enable function blocks to read the outputs of local sensors and to command local devices to perform one or more functions such as moving a valve member. Transducer blocks typically contain information that is necessary to interpret signals delivered by a local device and to properly control local hardware devices including, for example, information identifying the type of a local device, calibration information associated with a local device, etc. A single transducer block is typically associated with each input or output function block.

Most function blocks are capable of generating alarm or event indications based on predetermined criteria and are capable of operating differently in different modes. Generally speaking, function blocks may operate in an automatic mode, in which, for example, the algorithm of a function block operates automatically; an operator mode in which the input or output of a function block, is controlled manually; an out-of-service mode in which the block does not operate; a cascade mode in which the operation of the block is affected from (determined by) the output of a different block; and one or more remote modes in which a remote computer determines the mode of the block. However, other modes of operation exist in the Fieldbus protocol.

Importantly, each block is capable of communicating with other blocks in the same or different field devices over the Fieldbus bus 34 using standard message formats defined by the Fieldbus protocol. As a result, combinations of function blocks (in the same or different devices) may communicate with each other to produce one or more decentralized control loops. Thus, for example, a PID function block in one field device may be connected via the bus 34 to receive an output of an AI function block in a second field device, to deliver data to an AO function block in third field device, and to receive an output of the AO function block as feedback to create a process control loop separate and apart from any DCS controller. In this manner, combinations of function blocks move control functions out of a centralized DCS environment, which allows DCS multi-function controllers to perform supervisory or coordinating functions or to be eliminated altogether. Furthermore, function blocks provide a graphical, block-oriented structure for easy configuration of a process and enable the distribution of functions among field devices from different suppliers because these blocks use a consistent communication protocol.

In addition to containing and implementing block objects, each field device includes one or more other objects including link objects, trend objects, alert objects, and view objects. Link objects define the links between the inputs and outputs of blocks (such as function blocks) both internal to the field device and across the Fieldbus bus 34.

Trend objects allow local trending of function block parameters for access by other devices such as the host 12 or controllers 14 of FIG. 1. Trend objects retain short-term historical data pertaining to some, for example, function block parameter and report this data to other devices or function blocks via the bus 34 in an asynchronous manner. Alert objects report alarms and events over the bus 34. These alarms or events may relate to any event that occurs within a device or one of the blocks of a device. View objects are predefined groupings of block parameters used in standard human/machine interfacing and may be sent to other devices for viewing from time to time.

Figure 2:
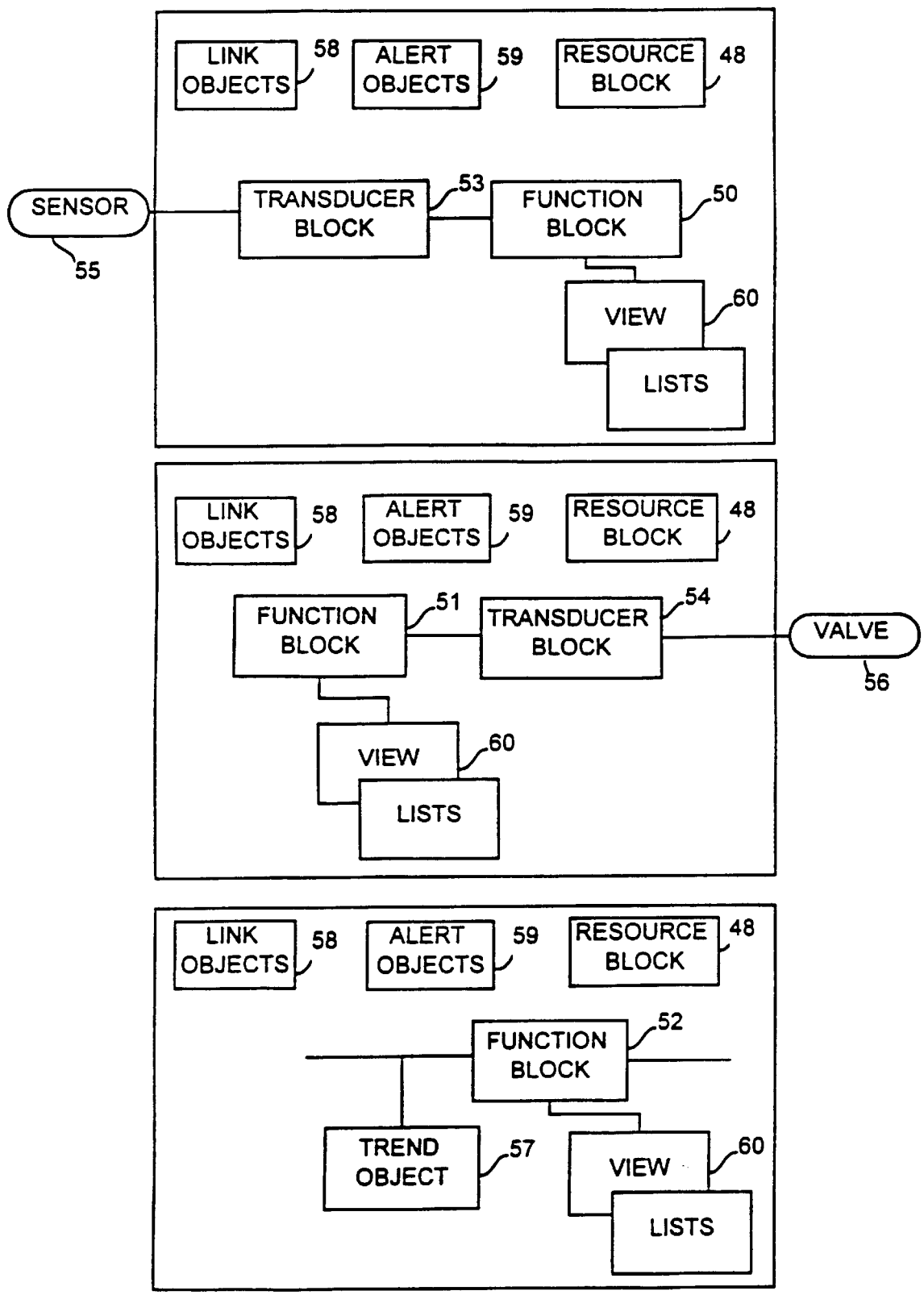
FIG. 2 is a schematic block diagram of three Fieldbus devices having function blocks therein.

Referring now to FIG. 2, three Fieldbus devices, which may be, for example, any of the field devices 16–28 of FIG. 1, are illustrated as including resource blocks 48, function blocks 50, 51, or 52 and transducer blocks 53 and 54. In the first device, the function block 50 (which may be an input function block) is coupled through the transducer block 53 to a sensor 55, which may be, for example, a temperature sensor, a set point indication sensor, etc. In the second device, the function block 51 (which may be an output function block) is coupled through the transducer block 54 to an output device such as a valve 56. In the third device, function block 52 (which may be a control function block) has a trend object 57 associated therewith for trending the input parameter of the function block 52.

Link objects 58 define the block parameters of each of the associated blocks and alert objects 59 provide alarms or event notifications for the each of the associated blocks. View objects 60 are associated with each of the function blocks 50, 51, and 52 and include or group data lists for the function blocks with which they are associated. These lists contain information necessary for each of a set of different defined views. Of course, the devices of FIG. 2 are merely exemplary and other numbers of and types of block objects, link objects, alert objects, trend objects, and view objects may be provided in any field device.

Figure 3:
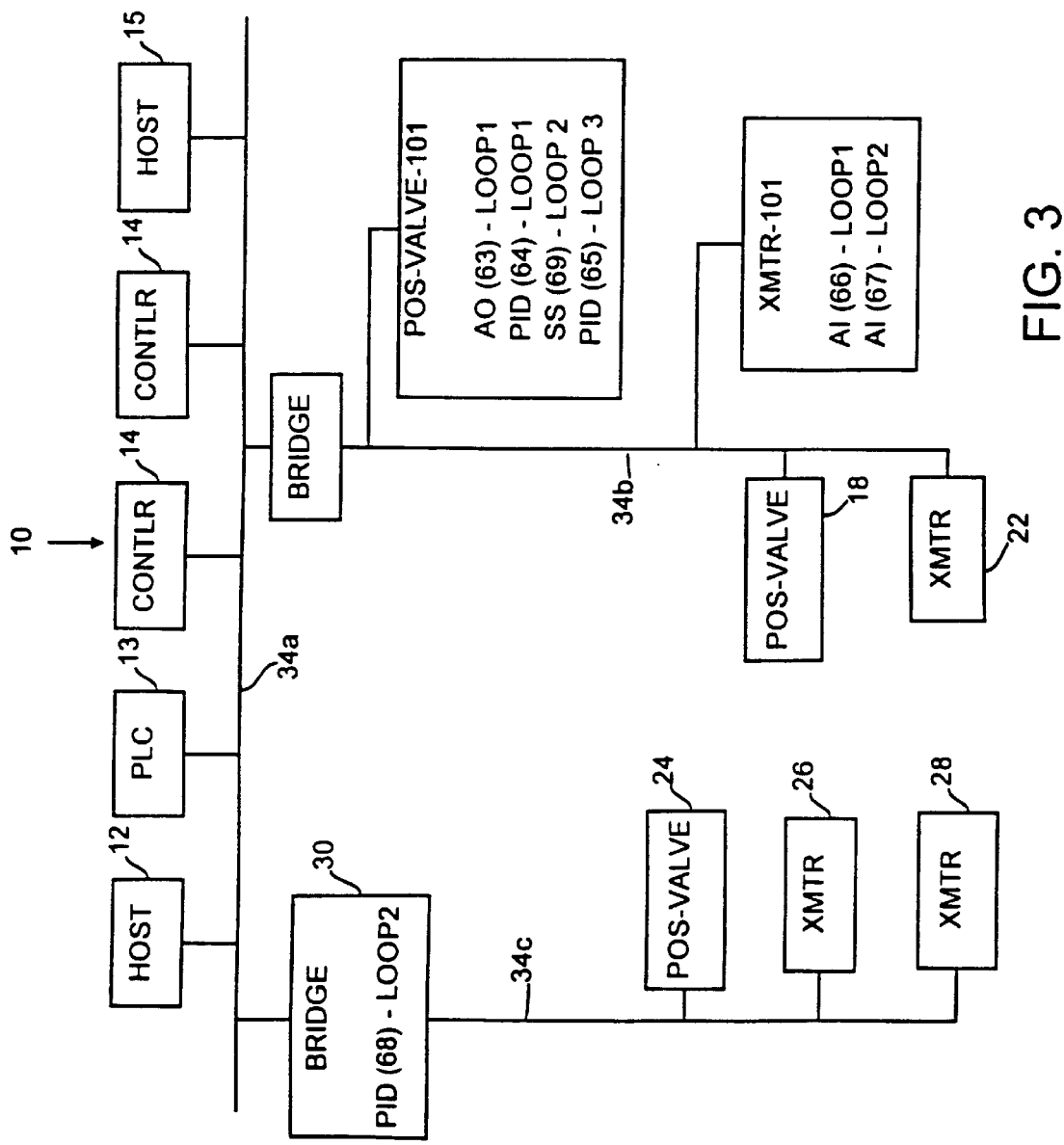
FIG. 3 is a schematic block diagram illustrating the function blocks within some of the devices of the process control network of FIG. 1.

Referring now to FIG. 3, a block diagram of the process control network 10 depicting the devices 16, 18, and 24 as positioner/valve devices and the devices 20, 22, 26, and 28 as transmitters also illustrates the function blocks associated with the positioner/valve 16, the transmitter 20, and the bridge 30. As illustrated in FIG. 3, the positioner/valve 16 includes a resource (RSC) block 61, a transducer (XDCR) block 62, and a number of function blocks including an analog output (AO) function block 63, two PID function blocks 64 and 65, and a signal select (SS) function block 69. The transmitter 20 includes a resource block 61, two transducer blocks 62, and two analog input (AI) function blocks 66 and 67. Also, the bridge 30 includes a resource block 61 and a PID function block 68.

As will be understood, the different function blocks of FIG. 3 may operate together (by communicating over the bus 34) in a number of control loops and the control loops in which the function blocks of the positioner/valve 16, the transmitter 20, and the bridge 30 are located are identified in FIG. 3 by a loop identification block connected to each of these function blocks. Thus, as illustrated in FIG. 3, the AO function block 63 and the PID function block 64 of the positioner/valve 16 and the AI function block 66 of the transmitter 20 are connected within a control loop indicated as LOOP1, while the SS function block 69 of the positioner/valve 16, the AI function block 67 of the transmitter 20, and the PID function block 68 of the bridge 30 are connected in a control loop indicated as LOOP2. The other PID function block 65 of the positioner/valve 16 is connected within a control loop indicated as LOOP3.

Figure 4:
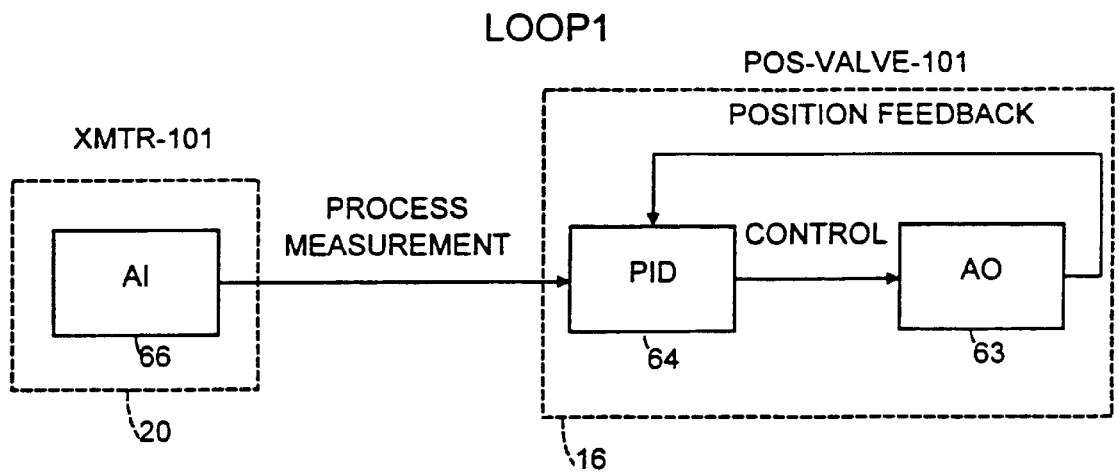
FIG. 4 is a control loop schematic for a process control loop within the process control network of FIG. 1.

The interconnected function blocks making up the control loop indicated as LOOP1 in FIG. 3 are illustrated in more detail in the schematic of this control loop depicted in FIG. 4. As can be seen from FIG. 4, the control loop LOOP1 is completely formed by communication links between the AO function block 63 and the PID function block 64 of the positioner/valve 16 and the AI function block 66 of the transmitter 20 (FIG. 3). The control loop diagram of FIG. 4 illustrates the communication interconnections between these function blocks using lines attaching the process and control inputs and outputs of these functions blocks. Thus, the output of the AI function block 66, which may comprise a process measurement or process parameter signal, is communicatively coupled via the bus segment 34b to the input of the PID function block 64 which has an output comprising a control signal communicatively coupled to an input of the AO function block 63. An output of the AO function block 63, which comprises a feedback signal indicating, for example, the position of the valve 16, is connected to a control input of the PID function block 64. The PID function block 64 uses this feedback signal along with the process measurement signal from the AI function block 66 to implement proper control of the AO function block 63. Of course the connections indicated by the lines in the control loop diagram of FIG. 4 may be performed internally within a field device when, as with the case of the AO and the PID function blocks 63 and 64, the function blocks are within the same field device (e.g., the positioner/valve 16), or these connections may be implemented over the two-wire communication bus 34 using standard Fieldbus synchronous communications. Of course, other control loops are implemented by other function blocks that are communicatively interconnected in other configurations.

To implement and perform communication and control activities, the Fieldbus protocol uses three general categories of technology identified as a physical layer, a communication "stack," and a user layer. The user layer includes the control and configuration functions provided in the form of blocks (such as function blocks) and objects within any particular process control device or field device. The user layer is typically designed in a proprietary manner by the device manufacturer but must be capable of receiving and sending messages according to the standard message format defined by the Fieldbus protocol and of being configured by a user in standard manners. The physical layer and the communication stack are necessary to effect communication between different blocks of different field devices in a standardized manner using the two-wire bus 34 and may be modeled by the well-known Open Systems Interconnect (OSI) layered communication model.

The physical layer, which corresponds to OSI layer 1, is embedded in each field device and the bus 34 and operates to convert electromagnetic signals received from the Fieldbus transmission medium (the two-wire bus 34) into messages capable of being used by the communication stack of the field device. The physical layer may be thought of as the bus 34 and the electromagnetic signals present on the bus 34 at the inputs and outputs of the field devices.

The communication stack, which is present in each Fieldbus device, includes a data link layer, which corresponds to OSI layer 2, a Fieldbus access sublayer, and a Fieldbus message specification layer, which corresponds to OSI layer 6. There is no corresponding structure for OS layers 3–5 in the Fieldbus protocol. However, the applications of a fieldbus device comprise a layer 7 while a user layer is a layer 8, not defined in the OSI protocol. Each layer in the communication stack is responsible for encoding or decoding a portion of the message or signal that is transmitted on the Fieldbus bus 34. As a result, each layer of the communication stack adds or removes certain portions of the Fieldbus signal such as preambles, start delimiters, and end delimiters and, in some cases, decodes the stripped portions of the Fieldbus signal to identify where the rest of the signal or message should be sent or if the signal should be discarded because, for example, it contains a message or data for function blocks that are not within the receiving field device.

The data link layer controls transmission of messages onto the bus 34 and manages access to the bus 34 according to a deterministic centralized bus scheduler called a link active scheduler, to be described in more detail below. The data link layer removes a preamble from the signals on the transmission medium and may use the received preamble to synchronize the internal clock of the field device with the incoming Fieldbus signal. Likewise, the data link layer converts messages on the communication stack into physical Fieldbus signals and encodes these signals with clock information to produce a "synchronous serial" signal having a proper preamble for transmission on the two-wire bus 34. During the decoding process, the data link layer recognizes special codes within the preamble, such as start delimiters and end delimiters, to identify the beginning and the end of a particular Fieldbus message and may perform a checksum to verify the integrity of the signal or message received from the bus 34. Likewise, the data link layer transmits Fieldbus signals on the bus 34 by adding start and end delimiters to messages on the communication stack and placing these signals on the transmission medium at the appropriate time.

The Fieldbus message specification layer allows the user layer (i.e., the function blocks, objects, etc. of a field device) to communicate across the bus 34 using a standard set of message formats and describes the communication services, message formats, and protocol behaviors required to build messages to be placed onto the communication stack and to be provided to the user layer. Because the Fieldbus message specification layer supplies standardized communications for the user layer, specific Fieldbus message specification communication services are defined for each type of object described above. For example, the Fieldbus message specification layer includes object dictionary services which allows a user to read an object dictionary of a device. The object dictionary stores object descriptions that describe or identify each of the objects (such as block objects) of a device. The Fieldbus message specification layer also provides context management services which allows a user to read and change communication relationships, known as virtual communication relationships (VCRs) described hereinafter, associated with one or more objects of a device. Still further, the Fieldbus message specification layer provides variable access services, event services, upload and download services, and program invocation services, all of which are well known in the Fieldbus protocol and, therefore, will not be described in more detail herein. The Fieldbus access sublayer maps the Fieldbus message specification layer into the data link layer.

To allow or enable operation of these layers, each Fieldbus device includes a management information base (MIB), which is a database that stores VCRs, dynamic variables, statistics, link active scheduler timing schedules, function block execution timing schedules and device tag and address information. Of course, the information within the MIB may be accessed or changed at any time using standard Fieldbus messages or commands. Furthermore, a device description is usually provided with each device to give a user or a host an extended view of the information in the VFD. A device description, which must typically be tokenized to be used by a host, stores information needed for the host to understand the meaning of the data in the VFDs of a device.

As will be understood, to implement any control strategy using function blocks distributed throughout a process control network, the execution of the function blocks must be precisely scheduled with respect to the execution of other function blocks in a particular control loop. Likewise, communication between different function blocks must be precisely scheduled on the bus 34 so that the proper data is provided to each function block before that block executes.

The way in which different field devices (and different blocks within field devices) communicate over the Fieldbus transmission medium will now be described with respect to FIG. 1. For communication to occur, one of the link master devices on each segment of the bus 34 (for example, devices 12, 16, and 26) operates as a link active scheduler (LAS)

which actively schedules and controls communication on the associated segment of the bus 34. The LAS for each segment of the bus 34 stores and updates a communication schedule (a link active schedule) containing the times that each function block of each device is scheduled to start periodic communication activity on the bus 34 and the length of time for which this communication activity is to occur. While there may be one and only one active LAS device on each segment of the bus 34, other link master devices (such as the device 22 on the segment 34*b*) may serve as backup LASs and become active when, for example, the current LAS fails. Basic devices do not have the capability to become an LAS at any time.

Generally speaking, communication activities over the bus 34 are divided into repeating macrocycles, each of which includes one synchronous communication for each function block active on any particular segment of the bus 34 and one or more asynchronous communications for one or more of the functions blocks or devices active on a segment of the bus 34. A device may be active, i.e., send data to and receive data from any segment of the bus 34, even if it is physically connected to a different segment of the bus 34, through coordinated operation of the bridges and the LASs on the bus 34.

During each macrocycle, each of the function blocks active on a particular segment of the bus 34 executes, usually at a different, but precisely scheduled (synchronous) time and, at another precisely scheduled time, publishes its output data on that segment of the bus 34 in response to a compel data command generated by the appropriate LAS. Preferably, each function block is scheduled to publish its output data shortly after the end of the execution period of the function block. Furthermore, the data publishing times of the different function blocks are scheduled serially so that no two function blocks on a particular segment of the bus 34 publish data at the same time. During the time that synchronous communication is not occurring, each field device is allowed, in turn, to transmit alarm data, view data, etc. in an asynchronous manner using token driven communications. The execution times and the amount of time necessary to complete execution of each function block are stored in the management information base (MIB) of the device in which the function block resides while, as noted above, the times for sending the compel data commands to each of the devices on a segment of the bus 34 are stored in the MIB of the LAS device for that segment. These times are typically stored as offset times because they identify the times at which a function block is to execute or send data as an offset from the beginning of an "absolute link schedule start time," which is known by all of the devices connected to the bus 34.

To effect communications during each macrocycle, the LAS, for example, the LAS 16 of the bus segment 34*b*, sends a compel data command to each of the devices on the bus segment 34*b* according to the list of transmit times stored in the link active schedule. Upon receiving a compel data command, a function block of a device publishes its output data on the bus 34 for a specific amount of time. Because each of the functions blocks is typically scheduled to execute so that execution of that block is completed shortly before the block is scheduled to receive a compel data command, the data published in response to a compel data command should be the most recent output data of the function block. However, if a function block is executing slowly and has not latched new outputs when it receives the compel data command, the function block publishes the output data generated during the last run of the function block and indicates that the published data is old data using a time-stamp.

After the LAS has sent a compel data command to each of the function blocks on particular segment of the bus 34 and during the times that function blocks are executing, the LAS may cause asynchronous communication activities to occur. To effect asynchronous communication, the LAS sends a pass token message to a particular field device. When a field device receives a pass token message, that field device has full access to the bus 34 (or a segment thereof) and can send asynchronous messages, such as alarm messages, trend data, operator set point changes, etc. until the messages are complete or until a maximum allotted "token hold time" has expired. Thereafter the field device releases the bus 34 (or any particular segment thereof) and the LAS sends a pass token message to another device. This process repeats until the end of the macrocycle or until the LAS is scheduled to send a compel data command to effect synchronous communication. Of course, depending on the amount of message traffic and the number of devices and blocks coupled to any particular segment of the bus 34, not every device may receive a pass token message during each macrocycle.

Figure 5:
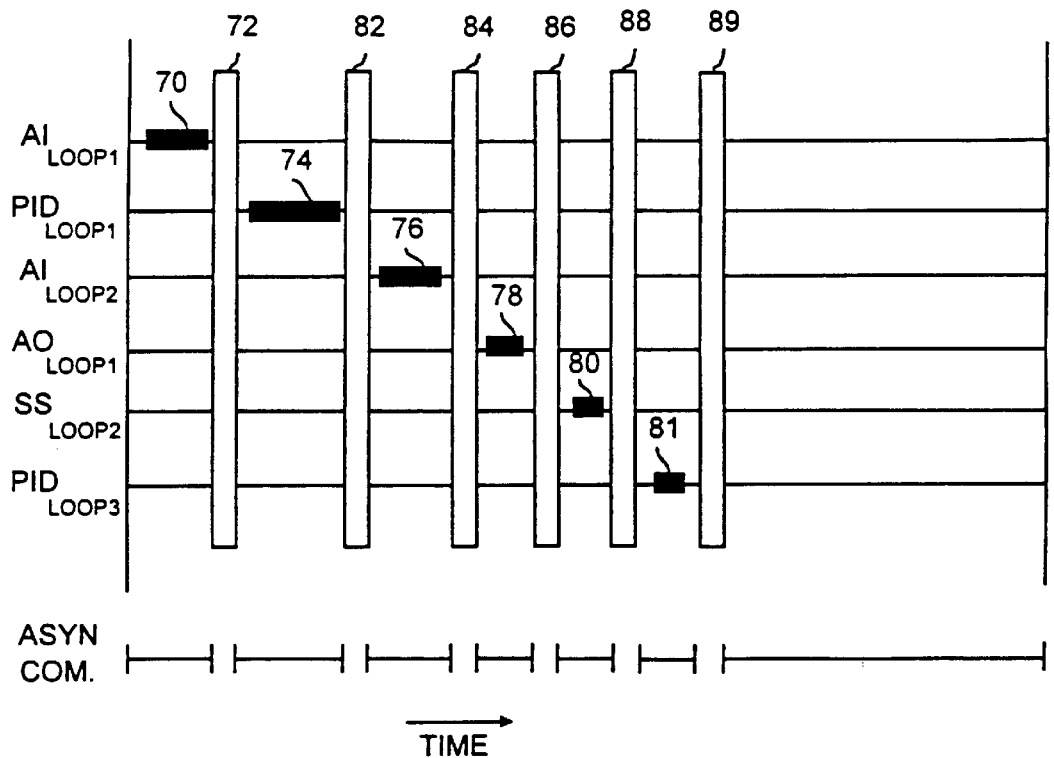
FIG. 5 is a timing schematic for a macrocycle of a segment of the bus of the process control network of FIG. 1.

FIG. 5 illustrates a timing schematic depicting the times at which function blocks on the bus segment 34*b* of FIG. 1 execute during each macrocycle of the bus segment 34*b* and the times at which synchronous communications occur during each macrocycle associated with the bus segment 34*b*. In the timing schedule of FIG. 5, time is indicated on the horizontal axis and activities associated with the different function blocks of the positioner/valve 16 and the transmitter 20 (of FIG. 3) are illustrated on the vertical axis. The control loop in which each of the functions blocks operates is identified in FIG. 5 as a subscript designation. Thus $AI_{Loop1}$ refers to the AI function block 66 of the transmitter 20, $PID_{LOOP1}$ refers to the PID function block 64 of the positioner/valve 16, etc. The block execution period of each of the illustrated function blocks is depicted by a cross-hatched box while each scheduled synchronous communication is identified by a vertical bar in FIG. 5.

Thus, according to the timing schedule of FIG. 5, during any particular macrocycle of the segment 34*b* (FIG. 1), the $AI_{LOOP1}$ function block executes first for the time period specified by the box 70. Then, during the time period indicated by the vertical bar 72, the output of the $AI_{LOOP1}$ function block is published on the bus segment 34*b* in response to a compel data command from the LAS for the bus segment 34*b*. Likewise, the boxes 74, 76, 78, 80, and 81 indicate the execution times of the function blocks $PID_{LOOP1}$, $AI_{LOOP2}$, $AO_{LOOP1}$, $SS_{LOOP2}$, and $PID_{LOOP3}$, respectively (which are different for each of the different blocks), while the vertical bars 82, 84, 86, 88, and 89 indicate the times that the function blocks $PID_{LOOP1}$, $AI_{LOOP2}$, $AO_{LOOP1}$, $SS_{LOOP2}$, and $PID_{LOOP3}$, respectively, publish data on the bus segment 34*b*.

As will be apparent, the timing schematic of FIG. 5 also illustrates the times available for asynchronous communication activities, which may occur during the execution times of any of the function blocks and during the time at the end of the macrocycle during which no function blocks are executing and when no synchronous communication is taking place on the bus segment 34*b*. Of course, if desired, different function blocks can be intentionally scheduled to execute at the same time and not all function blocks must publish data on the bus if, for example, no other device subscribes to the data produced by a function block.

Field devices are able to publish or transmit data and messages over the bus 34 using one of three virtual communication relationships (VCRs) defined in the Fieldbus access sublayer of the stack of each field device. A client/ server VCR is used for queued, unscheduled, user initiated, one to one, communications between devices on the bus 34. Such queued messages are sent and received in the order submitted for transmission, according to their priority, without overwriting previous messages. Thus, a field device may use a client/server VCR when it receives a pass token message from an LAS to send a request message to another device on the bus 34. The requester is called the "client" and the device that receives the request is called the "server." The server sends a response when it receives a pass token message from the LAS. The client/server VCR is used, for example, to effect operator initiated requests such as set point changes, tuning parameter access and changes, alarm acknowledgements, and device uploads and downloads.

A report distribution VCR is used for queued, unscheduled, user initiated, one to many communications. For example, when a field device with an event or a trend report receives a pass token from an LAS, that field device sends its message to a "group address" defined in the Fieldbus access sublayer of the communication stack of that device. Devices that are configured to listen on that VCR will receive the report. The report distribution VCR type is typically used by Fieldbus devices to send alarm notifications to operator consoles.

A publisher/subscriber VCR type is used for buffered, one to many communications. Buffered communications are ones that store and send only the latest version of the data and, thus, new data completely overwrites previous data. Function block outputs, for example, comprise buffered data. A "publisher" field device publishes or broadcasts a message using the publisher/subscriber VCR type to all of the "subscriber" field devices on the bus 34 when the publisher device receives a compel data message from the LAS or from a subscriber device. The publisher/subscriber relationships are predetermined and are defined and stored within the Fieldbus access sublayer of the communication stack of each field device.

To assure proper communication activities over the bus 34, each LAS periodically sends a time distribution message to all of the field devices connected to a segment of the bus 34, which enables the receiving devices to adjust their local application time to be in synchronization with one another. Between these synchronization messages, clock time is independently maintained in each device based on its own internal clock. Clock synchronization allows the field devices to time stamp data throughout the Fieldbus network to indicate, for example, when data was generated.

Furthermore, each LAS (and other link master device) on each bus segment stores a "live list," which is a list of all the devices that are connected to that segment of the bus 34, i.e., all of the devices that are properly responding to a pass token message. The LAS continually recognizes new devices added to a bus segment by periodically sending probe node messages to addresses that are not on the live list. In fact, each LAS is required to probe at least one address after it has completed a cycle of sending pass token messages to all of the field devices in the live list. If a field device is present at the probed address and receives the probe node message, the device immediately returns a probe response message. Upon receiving a probe response message, the LAS adds the device to the live list and confirms by sending a node activation message to the probed field device. A field device remains on the live list as long as that field device responds properly to pass token messages. However, an LAS removes a field device from the live list if the field device does not, after three successive tries, either use the token or immediately return the token to the LAS. When a field device is added to or removed from the live list, the LAS broadcasts changes in the live list to all the other link master devices on the appropriate segment of the bus 34 to allow each link master device to maintain a current copy of the live list.

As noted above, the communication interconnections between the field devices and the function blocks thereof are determined by a user and are implemented within the process control network 10 using a configuration application located in, for example, the host 12. However, after being configured, the process control network 10 operates without any consideration for device or process diagnostics and, therefore, interfaces with the host 12 to perform standard I/O functions, but not diagnostic functions.

Figure 6:
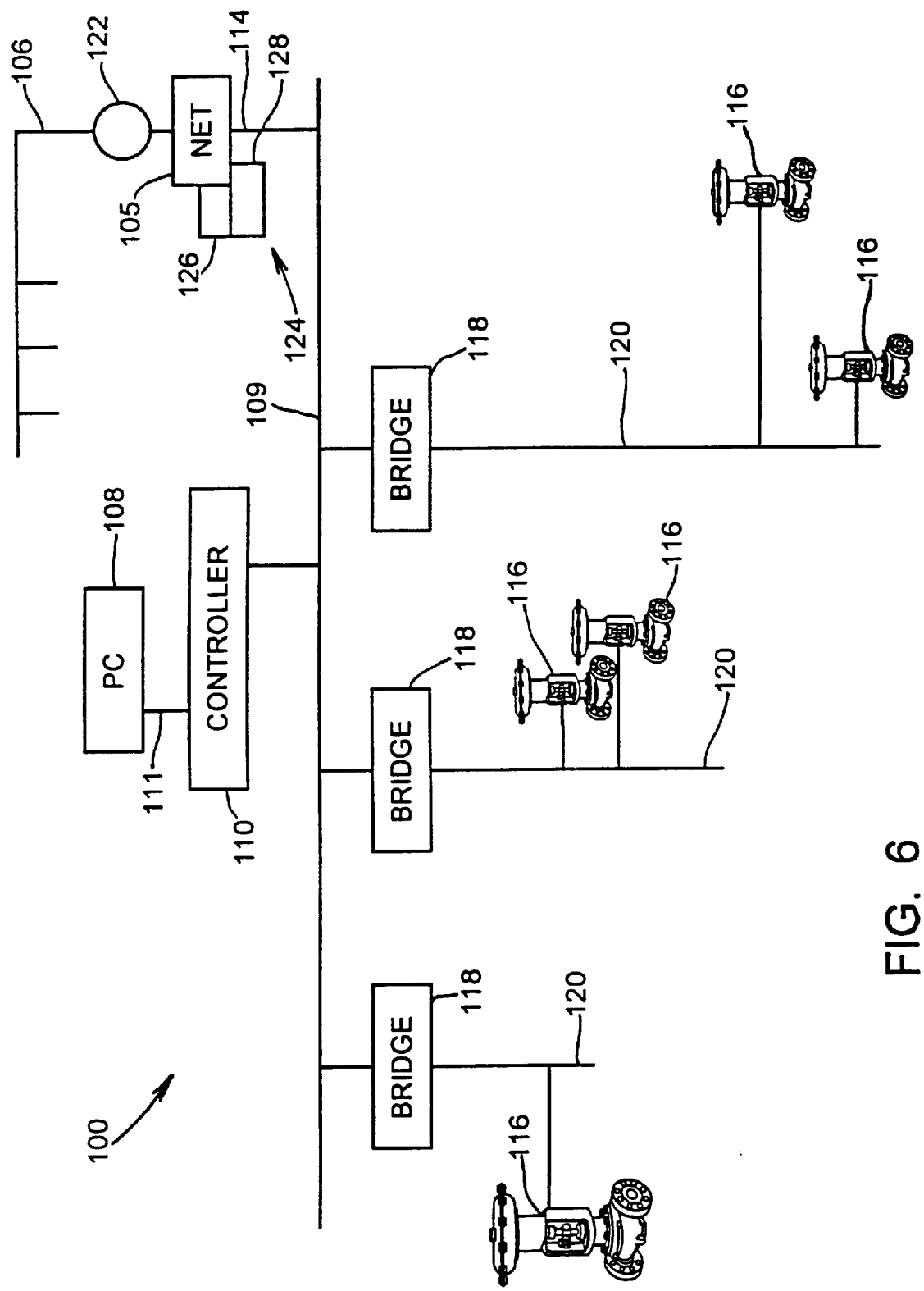
FIG. 6 is a schematic block diagram illustrating a control system network including a network accessible Fieldbus interface in accordance with the present invention.

Referring to FIG. 6, a schematic block diagram illustrates a process control system or network 100 including a network accessible Fieldbus interface (NAFI) 105 that is connected to a remote communications network 106. The illustrated control system network 100 includes a computer 108, such as a personal computer or workstation, that is connected to a network bus 109 by a controller 110, such as a digital control system controller. The computer 108 is connected to the controller 110 via a bus 111. The control system network 100 communicates with the external or remote network 106 by a connection of the network bus 109 at a node 114 and includes a plurality of field devices 116 that are connected to the network bus 109 directly or that are connected to the network bus 109 by a bridge device 118 via a local bus 120. Each bridge device 118 is typically used to transfer data from a higher frequency bus to a lower frequency bus and vice versa.

The NAFI device 105 is connected between the network bus 109 and a network connection terminal 122 which, in turn, is connected to the remote network 106. Of course, the remote network 106 may have any desired network configuration including, for example, a wide area network (WAN) configuration, a local area network (LAN) configuration, an Ethernet configuration, a modem connection to telephone communications, a radio transmission connection, and the like. The NAFI device 105 is a computer system such as a personal computer, workstation, or any other system having a special-purpose computer-based communication system or special-purpose computer-based process controller. The NAFI device 105 includes a software system 124 that serves as a software interface between the control system network 100 and the remote network 106 and that includes a standard process control network communication software stack 126 (such as a Fieldbus communication software stack) and a user software layer 128.

The communication software stack 126 is a software interface that controls communication of messages among devices operating in a physical layer of the process control network communication system, i.e., the messages arriving at the software stack 126. As described above, the communication software stack 126 is used by many various application programs for accessing data in field devices and the communication software stack 126 handles communications using low-level protocols including the Fieldbus protocol. The user software layer 128 performs user interface operations for controlling the NAFI device 105, controls the communication software stack 126 to communicate over the process control system 100 to, for example, retrieve specified data from one or more devices within the process control system 100, monitors designated message traffic on the communication software stack 126 including read and write operations and corresponding data, copies the designated message traffic to a file within the device 105, and transmits the file to a remote site though the remote network 106.

Of course, when used with a Fieldbus system, the NAFI device 105 interfaces to the network bus 109 via a two-wire terminal connection that is generally used for connecting devices such as the controller 110, the bridge devices 118, or the field devices 116 to the network bus 109 or 120. However, the NAFI device 105 can be used to interface with other types of process control systems or networks besides Fieldbus networks including, for example, Profibus networks.

Figure 7:
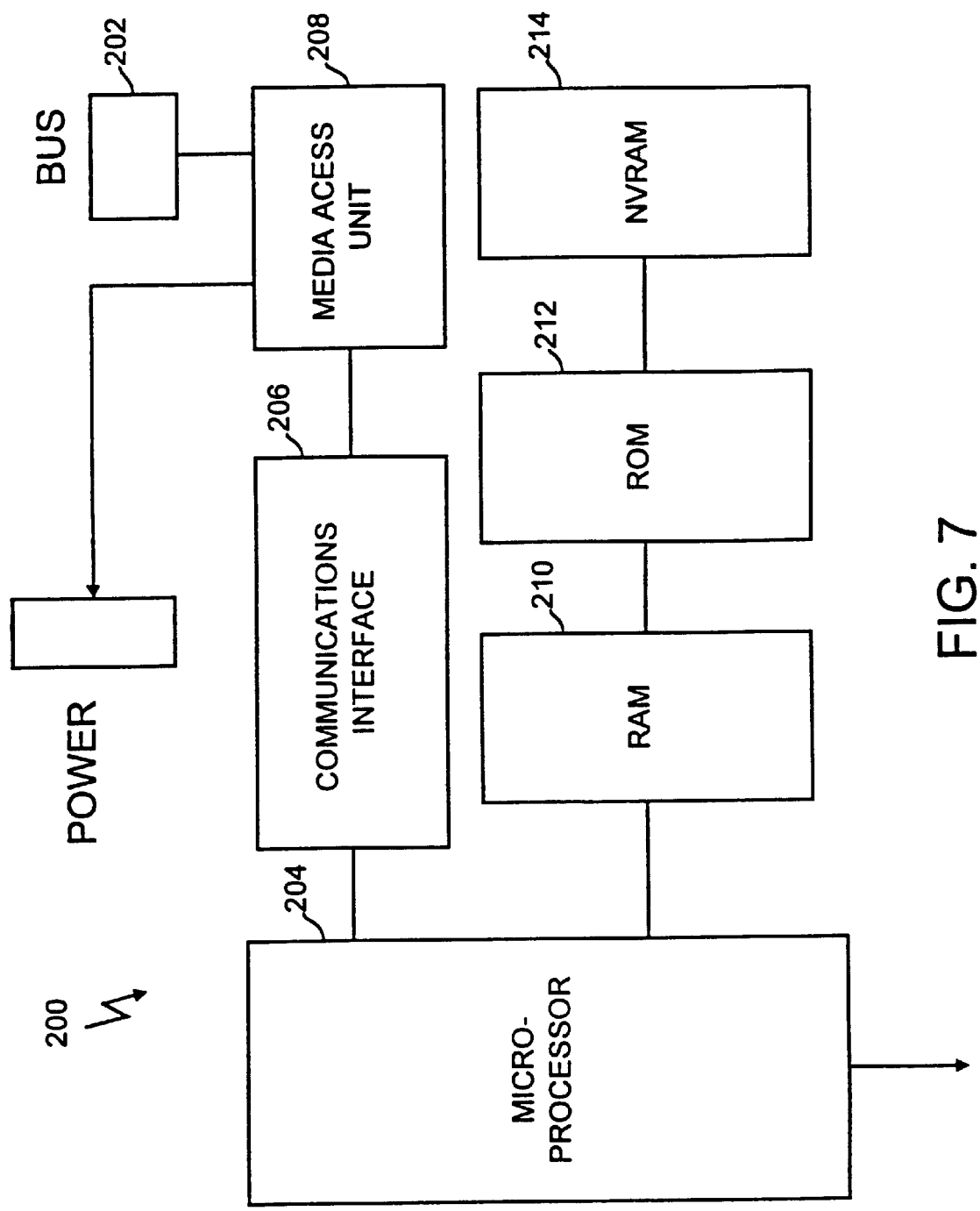
FIG. 7 is a schematic block diagram illustrating a suitable computer system capable of implementing an embodiment of a network accessible Fieldbus interface in accordance with an embodiment of the present invention.

Referring to FIG. 7, a high-level schematic block diagram illustrates a computer system 200 suitable for use as the NAFI device 105. The computer system 200 of FIG. 7 is highly generic and applicable to many configurations with extended functional blocks and applications. The NAFI device 105 (computer system 200) has a two-wire terminal block 202 that connects to a two-wire media (such as a bus) or that connects to a two-wire media connection terminal of a device. The NAFI 105 also includes a microprocessor 204, a communications interface 206, a media access unit 208, and a plurality of storage units such as a random access memory (RAM) 210, a read only memory (ROM) 212 and a nonvolatile random access memory (NVRAM) 214. The communications interface 206 is a circuit that performs serial to parallel protocol conversion and parallel to serial protocol conversion and that adds framing information to data packets according to the definition of the communication protocol of the process control system in which the device 105 is being used. As illustrated in FIG. 7, the interface 206 forms an interface between the microprocessor 204 and the media access unit 208 which may be used to convert, for example, a two-wire media communication signal to a digital representation of the communication signal. The media access unit 208 receives power from the two-wire media or from a conventional power source and supplies this power to other circuits in the NAFI device 105. The media access unit 208 also 208 performs wave-shaping and signaling on the two-wire media or bus (such as the bus 109 of FIG. 6).

The storage devices 110, 112 and 114 supply memory to the NAFI device 105 and interface with the microprocessor 204. In the illustrated embodiment, the RAM 210 may be a 128 Kbyte storage unit, the ROM 212 may be a 256 Kbyte storage unit and the NVRAM 214 may be a 32 Kbyte nonvolatile storage unit.

The NAFI device 105 executes instructions in the microprocessor 204 from a program code stored in one or more of the storage devices 210, 212 or 214 to perform communication interfacing. The NAFI device 105 may be implemented in virtually any computer system in the control system network 100 including computer systems in the controller 110, any of the bridge devices 118, and/or the field devices 116 as well as in a stand-alone computer system.

Figure 8:
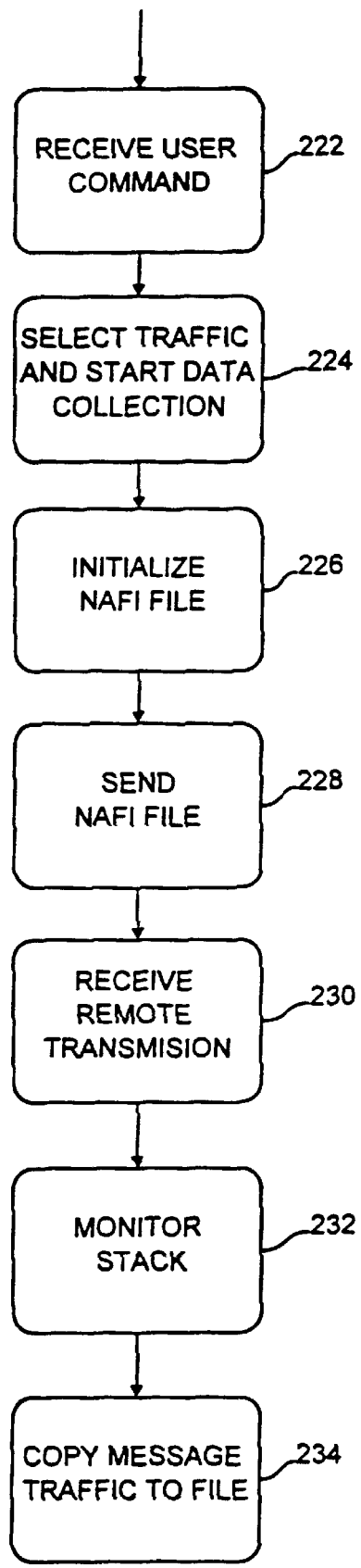
FIG. 8 is a flow chart illustrating operations performed by the network accessible Fieldbus interface of the present invention.

Referring to FIG. 8, a flow chart illustrates operations performed by the NAFI software system or device 105. In a receive user command step 222, the NAFI software system 105 receives user commands from a user including: (1) commands by a local user initiating data collection and defining the particular traffic on the communication software stack 126 to be monitored, (2) commands by a local user for initializing a NAFI transfer file, (3) commands by a local user or a remote user at a remote site for sending a NAFI transfer file to a remote device, (4) commands and corresponding data received from a remote user at a remote source, and (5) commands received from the remote user at the remote site requesting the transmission of a designated NAFI transfer file. The receive user command step 222 is typically interrupt-driven and asynchronous.

For a command initiating data collection and defining the particular traffic on the communication software stack 126 to be monitored, a select traffic and start data collection step 224 sets various conditional variables or statements that define the message traffic to be monitored and requests that the communication software stack 126 transfer data to the user software layer 128 corresponding to the requested data.

For a command initializing a NAFI transfer file, an initialize NAFI file step 226 is performed. During this step, data is transferred via the communication software stack 126 using various application programs. The user software layer 128 monitors any designated data or all data, if desired, no matter what application program generates the data transfer. One example of an application program using the communication software stack 126 for communications with field devices is ValveLink software that communicates with a control valve via the control system network 100. ValveLink software is manufactured by and available from Fisher Control International Inc. in conjunction with its Valvelink products. The NAFI software system 105 may monitor data with respect to any dialog system that reads and writes via the communication software stack 126 and the user software layer 128 accesses any data on the network bus 109 for remote communication.

For a command to send a NAFI transfer file to a remote device, a send NAFI file step 228 transmits the messages and data in the NAFI file to a remote site which is addressed in accordance with, for example, an argument of the transmit command. The messages and data that are sent to the remote site include requests and replies that are handled by the communication software stack 126 during control and data transmission operations of the control system network 100 in accordance with the communication protocol of the control system network 100, such as the Fieldbus protocol. Advantageously, the amount of information transferred over the remote network 106 is very small compared to data in other forms, such as the transmission of an entire computer screen or the transmission of data burdened by handling information added during passage through numerous network nodes. Thus, the NAFI device 105 advantageously reduces the overhead expenditure in time and data transfer size for communicating field device data over a network. The NAFI transfer file is sent over the remote network 106 to the defined remote site, which loads the file so that messages and data defined by the control system network protocol are available for analysis and display at the remote site which, in turn, allows the remote user to run applications corresponding to applications executed by the local user to recreate operations and test conditions during remote diagnosis and interrogations and investigations of device status and problems. Of course the remote user must have appropriate software that decodes or deciphers the meaning of the data sent from the NAFI device. In any event, data communication using the NAFI device 105 advantageously permits remote diagnostic testing, maintenance and troubleshooting. Furthermore, messages and information are advantageously transmitted very rapidly using the NAFI device 105 because the data is transmitted asynchronously and independently between the local user and the remote user to thereby avoid synchronization problems. Moreover, the data and messages are transmitted asynchronously with respect to the collection of data so that data collection and data transmission are advantageously disconnected, preventing a bottleneck condition in which data collection is stalled when a network communication connection is unavailable and communication is stalled while waiting for data to be collected.

For a command and corresponding data received from a remote source, a receive remote transmission step 230 receives the command and data and initiates any commanded operations on the local control system network 100 using standard communication devices, such as a software communication stack associated with the communication protocol used by the control system network 100.

In a monitor stack step 232, the NAFI software system 124 monitors the message traffic on the communication software stack 126 that is designated by the user. The traffic is made available to the user software layer 128 in response to the request that the communication software stack 126 transfer data to the user software layer 128 made in select traffic and start data collection step 224. The message traffic includes the requests and replies that are communicated by the communication software stack 126 during process control operations.

A copy message traffic to a file step 234 copies read and write requests and data to a NAFI file. The NAFI file may be one file of a plurality of NAFI files that are designated for storing specific information, such as information regarding a specific field device or valve and these files may be stored in any of the memory units 210 or 214 of the NAFI device 105.

As will be evident, the NAFI device 105 is a simple system that is implemented as a computer system with NAFI software system 124 advantageously avoiding the use of expensive and complicated high-speed communication gear including fiber-optic links and converters.

Figure 9:
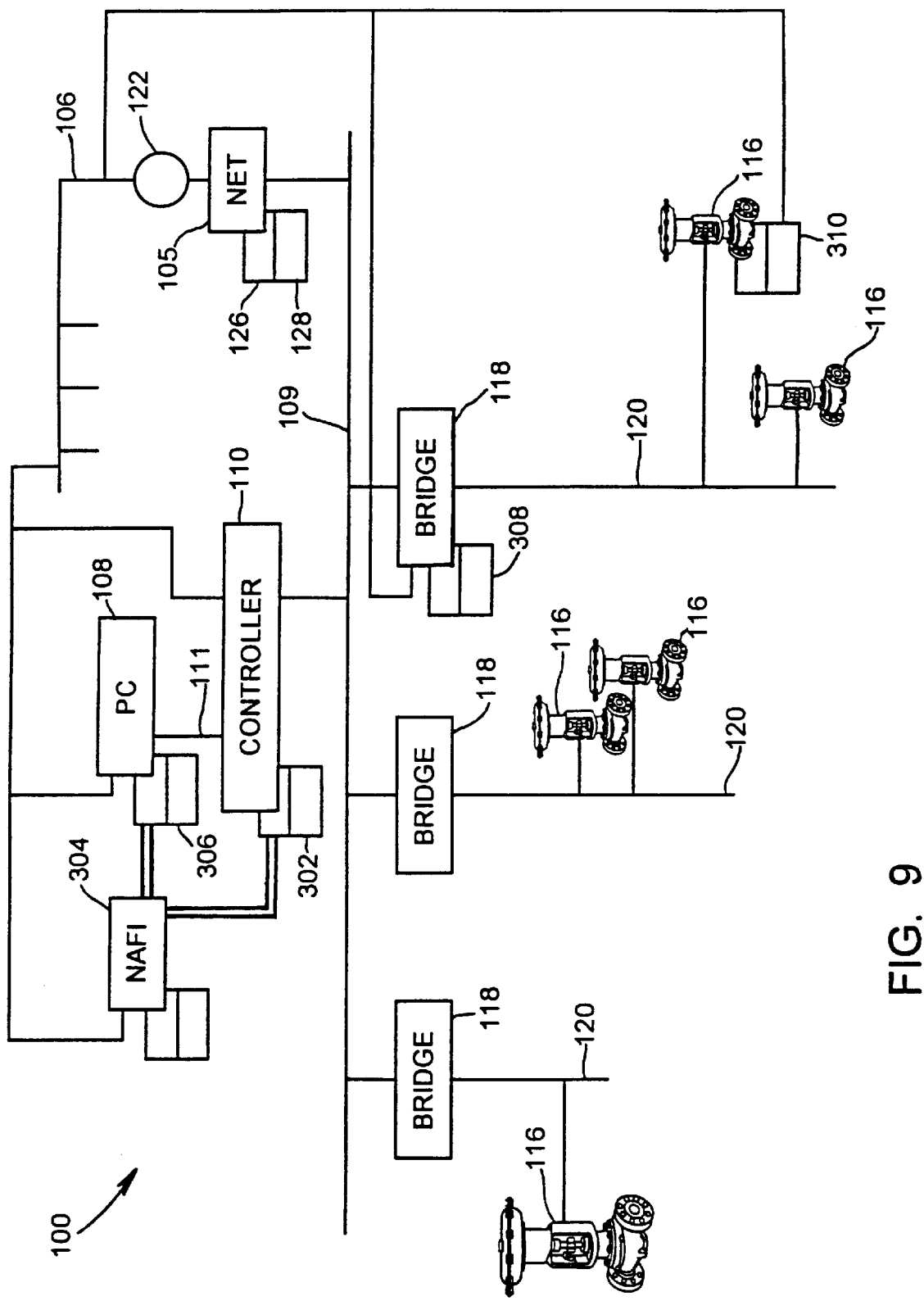
FIG. 9 is a schematic block diagram illustrating several examples of network accessible Fieldbus interface implementations.

Referring now to FIG. 9, a schematic block diagram shows several possible implementations of a network accessible Fieldbus interface for communicating between one or more of a plurality of process control elements and remote elements. The NAFI device 105 is illustrated in accordance with the NAFI connection shown in FIG. 6. In addition, a NAFI device or interface 302 is illustrated as being incorporated into the controller 110. The NAFI device 302 may be connected to the remote network 106 directly or by a connection through a further NAFI device 304, illustrating a NAFI-NAFI connection. Similarly, the computer 108 may incorporate a NAFI device 306 that is connected to the remote network 106 directly or by a connection to the NAFI device 304. The network accessible interface of the present invention may also be incorporated into other devices including any of the bridge devices 118 and/or field devices 116, which may be fluid control valves or any other types of field device such as sensors, transmitters, wall-mounted panels, etc. A NAFI device 308 incorporated into one of the bridges 118 and a NAFI device 310 incorporated into one of the field devices 116 are both shown connected directly to the remote network 106 but may, if desired, be indirectly connected via a further NAFI device.

Of course, the network accessible interface of the present invention may perform other functions as desired and may perform any combination of functions in any desired order to effect communications between a process control network and a remote network. Moreover, although the network accessible interface described herein is preferably implemented in software stored in, for example, a process control device, a controller or a personal computer, it may alternatively or additionally be implemented in hardware, firmware, etc., as desired. That is, the processor described herein may include any hardwired logic arrays or other hardware devices designed to implement the functionality described herein. If implemented in software, the network accessible interface of the present invention may be stored in any computer readable memory such as on a magnetic disk, a laser disk, or other storage medium, in a RAM or ROM of a computer, etc. Likewise, this software may be delivered to a user or a device via any known or desired delivery method including, for example, over a communication channel such as a telephone line, the internet, etc. Still further, while the network accessible interface device is described herein as implementing or using a communication software stack conforming to the Open Systems Interconnect (OSI) layered communication model to perform communication functions in a process control system, it will be understood that this communication software stack may be implemented by any software that performs standard communication functions according to a communication protocol, whether or not these functions are implemented in a stack format such as that described by the OSI model.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. An interface between a communications network that uses a first communication protocol and a process control system having a bus that uses a second communication protocol, the interface comprising:
   a processor;
   a storage device coupled to the processor;
   a software system for executing on the processor including;
      a communication software stack adapted to be communicatively coupled to the bus and to operate in the process control system using the second communication protocol;
      a monitoring routine adapted to monitor message traffic on the communication software stack,
      a copying routine adapted to copy the message traffic to the storage device, and
      a media interface routine adapted to enable remote access to the storage device via the communications network using the first communication protocol.

2. The interface of claim 1 wherein the communication software stack includes a control routine adapted to control communications in the process control system using a two-wire, two-way, loop-powered digital communication protocol.

3. The interface of claim 1 wherein the communication software stack includes a control routine adapted to control communications in the process control system using a Fieldbus protocol.

4. A software program system adapted to be used with a processor to implement an interface between a communications network that uses a first communication protocol and a process control system having a bus that uses a second communication protocol, the processor being coupled to a storage and including a communication software stack operating in the process control system, the software program comprising:
   a computer readable medium;
   an interface routine stored on the computer readable medium and adapted to monitor message traffic on the communication software stack;
   a copying routine stored on the computer readable medium and adapted to copy the message traffic to the storage; and a media interface routine stored on the computer readable medium and adapted to allow remote access to the storage via the communications network using the first communication protocol.

5. The software system of claim 4, wherein the software program system is adapted to be used as an interface between the communications network and a distributed process control system in which control functions are performed within processors within two or more devices distributed within the process control system and communicatively coupled together via the bus.

6. An interface adapted to be used between a communications network that uses a first communication protocol and a process control system having a bus that uses a second communication protocol, the interface comprising:
   a processor;
   a data storage coupled to the processor;
   a communication software stack adapted to be coupled to the bus and to operate in the process control system using the second communication protocol;
   an interface routine adapted to execute on the processor to monitor message traffic on the communication software stack;
   a copying routine adapted to execute on the processor to copy the message traffic to the data storage; and
   a media interface routine adapted to execute on the processor to enable remote access to the data storage via the communications network using the first communication protocol.

7. An interface adapted to be coupled between a remote communications network that uses a first communication protocol and a process control system having a bus that uses a second and different communication protocol to implement communications between three or more devices within the process control system, the interface comprising:
   a data storage device;
   a communication device coupled between the data storage device and the bus of the process control system, the communication device adapted to communicate on the bus of the process control system using the second communication protocol and to retrieve data from the bus of the process control system;
   a controller coupled to the data storage device, the communication device and the remote communications network that stores the retrieved data in the storage device, that communicates the data within the storage device over the remote communications network using the first communication protocol and that controls operation of the communication device.

8. The interface of claim 7, wherein the communication device includes a communication software stack having a communication routine that communicates in the process control system using a two-wire, two-way, loop-powered digital communication protocol.

9. The interface of claim 7, wherein the communication device includes a communication software stack that implements communications within the process control system.

10. The interface of claim 9, wherein the communication software stack is configured according to the Open Systems Interconnect layered communication model to implement communications within the process control system.

11. The interface of claim 7, wherein the communication protocol is a Fieldbus communication protocol.

12. The interface of claim 7, wherein the communication device includes a processor that implements a first routine to request data from a device within the process control system over the bus using the second communication protocol, a second routine to receive the requested data from the bus of the process control system and a third routine to deliver the received data to the controller.

13. The interface of claim 7, wherein the communication device includes a processor that implements a first routine to monitor communication data on the bus within the process control system, a second routine to recognize specific communication data specified by the controller and a third routine to deliver the specific communication data to the controller.

14. The interface of claim 7, wherein the controller is adapted to receive a message specifying specific data within the process control system, is adapted to control the communication device to retrieve the specific data from the process control system using the second communication protocol on the bus and is adapted to store the specific data in the storage device in response to the message.

15. The interface of claim 7, wherein the controller is adapted to receive a message requesting the transfer of specific data stored in the storage device over the remote communications network and includes a routine that transfers the specific data from the storage device over the remote communications network using the first communication protocol in response to the message.

16. The interface of claim 15, wherein the controller is adapted to receive the message from the remote communications network.

17. The interface of claim 15, wherein the controller is adapted to receive the message from the process control system.

18. The interface of claim 7, wherein the controller stores the data within the storage device asynchronously with respect to the controller communicating the data stored in the storage device over the remote communications network.

19. The interface of claim 7, wherein the remote communications network is a local area network or a wide area network.

20. The software system of claim 7, wherein the interface is adapted to be coupled between the remote communications network and a distributed process control system in which control functions are performed within processors within two or more devices distributed within the process control system and communicatively coupled together via the bus.

* * * * *